(12) United States Patent
Dillon et al.

(10) Patent No.: US 8,347,214 B2
(45) Date of Patent: Jan. 1, 2013

(54) AUTOMATED INTERFACE-SPECIFICATION GENERATION FOR ENTERPRISE ARCHITECTURES

(75) Inventors: Eric Dillon, Seattle, WA (US); Douglas Strombom, Issaquah, WA (US); Neil Buckley, Bellevue, WA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 11/372,479

(22) Filed: Mar. 9, 2006

(65) Prior Publication Data

US 2007/0061731 A1    Mar. 15, 2007

Related U.S. Application Data

(60) Provisional application No. 60/661,242, filed on Mar. 9, 2005, provisional application No. 60/680,757, filed on May 12, 2005, provisional application No. 60/734,206, filed on Nov. 7, 2005, provisional application No. 60/771,948, filed on Feb. 8, 2006.

(51) Int. Cl.
*G06F 3/00* (2006.01)

(52) U.S. Cl. ........................................ 715/749; 715/744

(58) Field of Classification Search ........... 715/700–867
See application file for complete search history.

(56) References Cited

U.S. PATENT DOCUMENTS

| 6,510,550 | B1 * | 1/2003 | Hightower et al. | 717/108 |
|---|---|---|---|---|
| 6,567,819 | B1 * | 5/2003 | Cheng et al. | 1/1 |
| 6,867,789 | B1 * | 3/2005 | Allen et al. | 715/744 |
| 6,978,379 | B1 * | 12/2005 | Goh et al. | 726/10 |
| 7,222,302 | B2 * | 5/2007 | Hauser et al. | 715/734 |
| 7,340,745 | B2 * | 3/2008 | Waldorf | 719/328 |
| 2005/0034107 | A1 * | 2/2005 | Kendall et al. | 717/136 |
| 2005/0091093 | A1 * | 4/2005 | Bhaskaran et al. | 705/7 |
| 2005/0197990 | A1 * | 9/2005 | Wu et al. | 706/48 |
| 2005/0235250 | A1 * | 10/2005 | Rajagopal et al. | 717/104 |
| 2005/0289536 | A1 * | 12/2005 | Nayak et al. | 717/174 |
| 2006/0080082 | A1 * | 4/2006 | Ravindra et al. | 704/8 |
| 2006/0156314 | A1 * | 7/2006 | Waldorf | 719/328 |
| 2007/0106722 | A1 * | 5/2007 | Zeldin et al. | 709/201 |

FOREIGN PATENT DOCUMENTS

WO    WO-2006099046 A2    9/2006

OTHER PUBLICATIONS

International Application No. PCT/US2006/006418, International Search Report and Written Opinion, mailed Sep. 27, 2007, 6 pgs.

\* cited by examiner

*Primary Examiner* — Rashawn Tillery (74) *Attorney, Agent, or Firm* — Schwegman, Lundberg & Woessener, P.A.

(57) ABSTRACT

In a computer-implemented method, a data set characterizing a first enterprise application is received. The data set is organized into a model. A set of standards is applied to the model, yielding a set of computer-executable instructions operable to enable implementation of an interface between the first enterprise application and a second enterprise application.

17 Claims, 7 Drawing Sheets

AUTOMATED INTERFACE-SPECIFICATION GENERATION FOR ENTERPRISE ARCHITECTURES

PRIORITY CLAIM

The present application claims priority from U.S. Provisional Application No. 60/661,242 filed on Mar. 9, 2005 entitled TIGERSTRIPE ENTERPRISE ARCHITECTURE; U.S. Provisional Application No. 60/680,757 filed on May 12, 2005 entitled SYSTEMS AND METHODS FOR ENTERPRISE ARCHITECTURE; and U.S. Provisional Application No. 60/734,206 filed on Nov. 7, 2005 entitled SYSTEM, METHODOLOGY AND TOOLS FOR GENERATING SERVICE DEFINITION APIs and U.S. Provisional Application No. 60/771,948 filed on Feb. 8, 2006 entitled SYSTEM AND METHOD FOR USING A TIGERSTRIPE WORKBENCH, each of which is incorporated herein by reference.

BACKGROUND OF THE INVENTION

Previous approaches to interfacing applications include non-standard interfaces and open-standard interfaces. Customized development of non-standard interfaces between applications is a common practice today for all enterprises. The work is typically performed by in-house information-technology (IT) engineers, by application vendors, or by independent software consultants. Alternatively, manual coding of open-standard interfaces between applications may be implemented. Open-standard interfaces may include Service Oriented Architecture (SOA), J2EE, WSDL, SOAP, XML, or others from specific industries like the Telemanagement Forum SID (www.tmforum.org) or the Operations Support System through Java (OSS/J) Initiative (www.ossj.org) in the telecommunications sector.

These approaches have disadvantages. First, customized development of interfaces is a very labor intensive task given that enterprise application interfaces are numerous, very complex, and expensive to maintain. Thus, a very large portion of an IT budget may be consumed by the integration and maintenance of interfaces. Second, upgrades or modifications to an underlying application may render an interface inoperable given that interfaces to applications are often tightly coupled to the applications. Thus, an application change may require additional upgrades or changes to a corresponding interface. Third, the architecture of an interface is often known only to the particular engineers who developed the interface. Thus, delays, malfunctions, and interruptions can result when certain engineers are unavailable to assist with ongoing interface problems.

Open-standard interfaces, like those defined in the Service Oriented Architecture (SOA), address some of the above concerns. To begin, open-standard interfaces are often loosely coupled to prevent changes in underlying applications from affecting an interface. However, open-standards interfaces are still difficult to design, specify, develop, and maintain specifically because open-standard interfaces require that files be exactly defined in accordance to certain standard rules. Defining files is laborious, tedious, and time consuming.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In the IT world, there are numerous application program interface (API) specifications that are written in different computer languages and that serve diverse purposes. In a very large number of cases, the APIs (the open ones as well as the proprietary ones) are generated by hand by a software engineer analyzing needs and coding the API specification in a specific computer language. In fact, poorly defined APIs may be indistinctly separated from other code that surrounds it for integration, customization or other application purposes. Poorly-defined APIs (especially proprietary ones) may be so dependent upon vendor-specific technology, or technology-specific approaches, that they only apply in a single case, and have zero re-usability.

The API landscape is changed dramatically when APIs can be generated automatically. There can be more APIs because they are less costly to build. The additional APIs can be fit-for-purpose to accomplish many more things. More interfaces will use well-defined APIs instead of being ad hoc. More APIs will be vendor and technology independent. The quality can be higher because they are generated by software; not hand coding. The APIs can be more elaborate and can utilize industry best practices, which once embodied in an API-generating tool according to an embodiment of the invention, are highly repeatable and inexpensive to achieve. More engineers will become qualified to create APIs because the knowledge level does not have to be as high when using a tool as is the case with hand coding.

An embodiment of the invention concerns creating tools to automate API design, development and testing. In order to generate APIs automatically, the APIs themselves may be evaluated and/or some guidelines, which may exist and that engineers may have tried to follow when coding the specification, may be evaluated, after which the API may be analyzed/decomposed into a set of interface artifact types.

In fact, many of the aforementioned existing APIs are poorly defined, are ad hoc in nature, are missing industry best practices, are targeted toward an old IT standard or architecture, etc. As such, the process of analyzing/decomposing and comparing to best practices is an opportunity to improve the API. In fact, in defining a new API, it may be preferable to start with an automation tool so that the design is already informed by all the best practices and guidelines.

Once the interface artifacts are understood, then one can create an abstract, modular, software "Artifact Representation" that will work whenever that type of artifact is used in any API. From the Artifact Representation level one can do many different things. One can create a model of a whole interface (or "Service Contract"), which can be stored, versioned, changed, displayed tabularly, displayed graphically, shared, derived from, transformed, verified, and thought about—all of these activities apply to the abstract model, before it is even turned into computer language.

Once an API model is created, and in a totally integrated fashion with the model, the whole lifecycle of an API is supported by an embodiment of the invention, from importing models from other sources, to deriving related APIs, to creating a simulation and test environment, to generating the run time code.

An embodiment of the automation engine embodies a standard, repeatable methodology that results in the generation of very richly featured APIs. An embodiment of the methodology includes, but is not limited to, the following steps: define the entity model, assign ownership, add operations, add notifications, add named queries and select deployment profiles. An embodiment of the methodology may be embodied in wizards utilized to present the design process to users in an easy-to-understand form.

Subsequently, one can generate a computer-language version of the interface from the model. One can choose at least one computer language and deployment profile, because one may have different needs depending on existing IT infrastructure, skills, enterprise architectural aspirations, etc. Additionally, one may turn the interface into an HTML website that can be read by and shared with others who can collaborate on what the model should look like. The abstract API model may be separate from the technology-dependent API that implements a particular deployment profile (although care should be taken with technology dependence because some deployment profiles, like Web services, are advantageously designed to be independent of lower levels of technology).

Once the tool and components are in place, one can create plug-ins that represent groupings of Artifact Representations and guidelines and best practices and call those an interface "style" which may correspond to a popular integration approach or to the work performed by an industry-standards group such as OSS/J. Using such a style, it is possible to generate any number of APIs that conform to the core characteristics of that standard or approach. This can even add consistency, ease of development and higher conformity to the API standards themselves when tooling is used by the standards bodies.

When one assembles Artifact Representations into "Service Contracts" which represent a whole service-oriented way of thinking about how information producers "contract" with information consumers to produce their information, one opens up an entirely new range of possibilities. The APIs may no longer be just point-to-point between two tightly coupled systems; they can represent an abstract service definition that can be accessed by many applications and users. These service-oriented contracts are difficult to conceptualize, design, specify and develop, but, with an embodiment of the invention, it is very straightforward to do so.

The ability to easily generate Service Contracts enables and plays into an IT mega-trend, which may be SOA, and the transformation of all businesses into service businesses, and all enterprise IT systems into service-delivery mechanisms. For example, in Telecommunications, Service Contracts generated by an embodiment of the invention can be used to define Telecom service delivery APIs, which can be used to decompose any telecommunications service and assemble the Artifact Representations for each component into new revenue-generating teleservices. These could be embodied as APIs that are available on a Service Delivery Platform in order to perform integration with other enterprise applications, such as, for example, billing, CRM, or service-quality management, and in order to define the very services themselves that the telecommunications service provider wants to offer.

An embodiment of the invention provides a modeling environment that focuses on the design, specification, test and deployment of integration interfaces between systems and applications in a typical enterprise architecture.

Enterprise integration enables the exchange of information between applications and systems in an enterprise architecture. In the past, the design, specification and implementation of the integration points between these applications have been time-consuming and error-prone, have been deployed with very-tightly-coupled systems, and therefore have been difficult and costly to maintain.

Recently, SOA has brought a new vision in how an enterprise-architecture blueprint can be thought through and implemented, by using the concept of abstract services, offering very specific, self contained capabilities that can be composed into more complex services to support end-to-end business processes. The correct specification of services in alignment with the enterprise's business requirements, and the right level of granularity in the design and assembly of these services lead to a more agile IT architecture, ultimately leading to more cost-effective IT spending and time to market.

With this approach, a key to success lies in the design of these enterprise services: for example, the key services to include in an enterprise architecture; the right level of granularity; the best practices to apply; the design patterns to use to ensure consistency across services in the enterprise. An embodiment of the invention provides a unique design environment that helps an enterprise architect address such issues by allowing the architect to capture business requirements and turn them automatically into documented service specifications ready for implementation and deployment.

When designing a Service Oriented Architecture, a key to success lies in the definition, design and documentation of the services themselves before proceeding to implementation and deployment. Since a Service Oriented Architecture involves data communications between Service Consumers and Service Producers it becomes preferable to capture in a Service Contract the specifics of a service as it is being provided for consumption. Once such a contract is published for all services available in the enterprise architecture, assembling existing services into more complex ones to support business processes becomes easier and less error-prone. This repository of well-specified and documented Service Contracts allows quickly supporting new business processes or evolving existing ones rapidly.

An embodiment of the invention acknowledges these principles by focusing on Service Contracts that capture, in business terms, the specifics of a Service as it can be offered to its consumers. From a high-level perspective, Service Contracts may include the following:

Documentation, from basic identification of a contract to details about governance, use cases and deployment related information, Information Model, as it is understood and presented by the Service (e.g., how a customer is represented, the details of a network resource that are exposed through the service, etc.).

Capabilities, as offered by the service (e.g., whether the service offers any query mechanism, whether there any unsolicited notifications that service consumers can subscribe to, etc.).

Through a set of traditionally formatted user-interface wizards, an embodiment of the invention guides the enterprise architect through the definition of one or more Service Contracts. Once a Service Contract is defined, an embodiment of the invention can automatically generate the following:

"Tight-Specification", a technology-specific specification of the Service Contract, including, for example, J2EE, XML-based messaging or Web Services (WSDL).

Web-based Documentation, detailing the information and capabilities of a Service Contract in a format that can be published within the enterprise or provided as reference for implementation (e.g., to System Integrators or in-house implementation teams).

An embodiment of the invention provides a methodology for defining a Service Contract that uses abstract, modular Artifact Representations in order to conform to any interface standard and to define any standard or non-standard interface for exchanging information between any producing and consuming enterprise applications.

Figure 1:
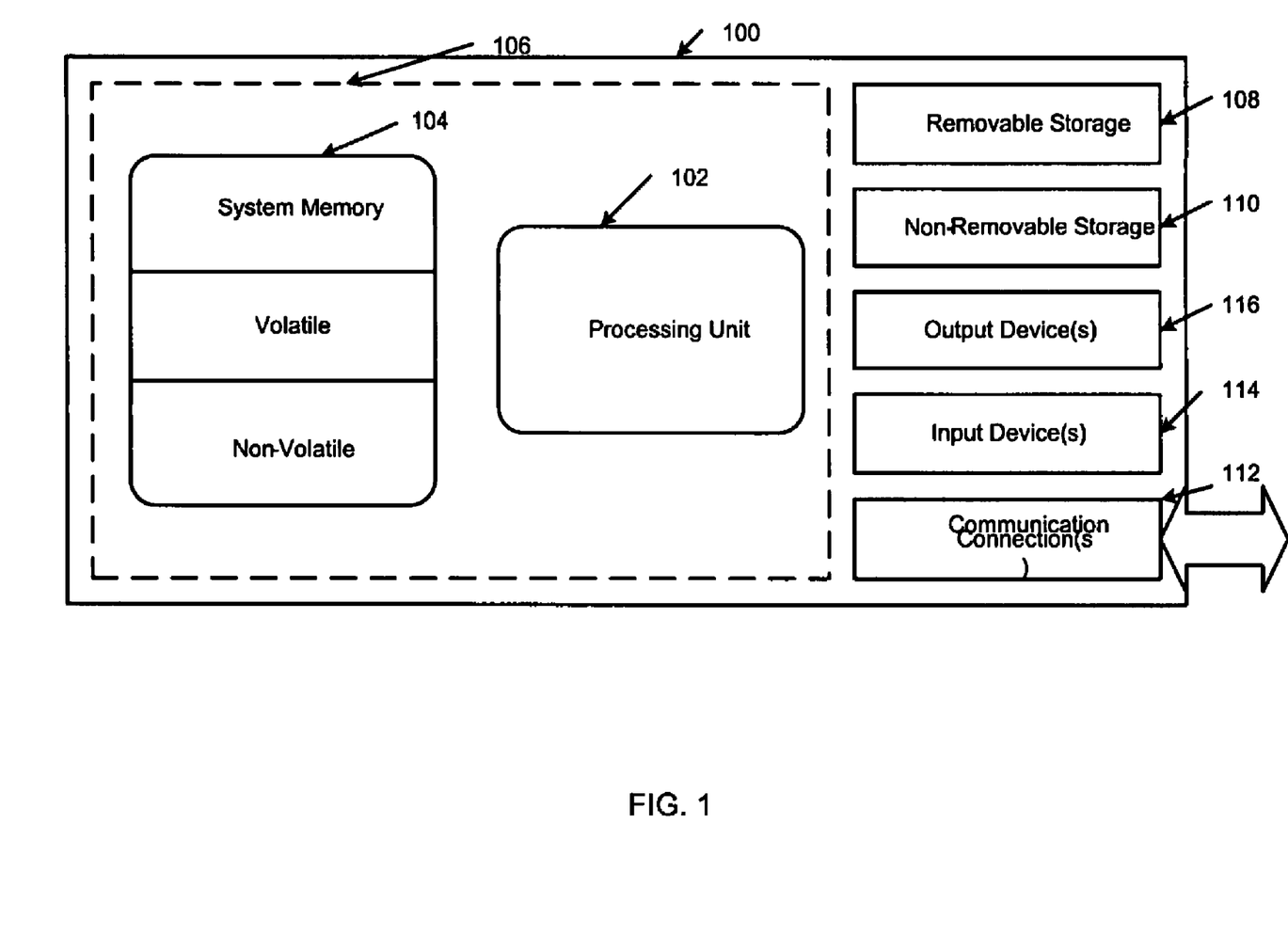
FIG. 1 is a schematic view of an exemplary operating environment in which an embodiment of the invention can be implemented.

FIG. 1 illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, mobile devices, such as cell phones, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

With reference to FIG. 1, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 1 by dashed line 106.

Additionally, device 100 may have additional features/ functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included.

Figure 2:
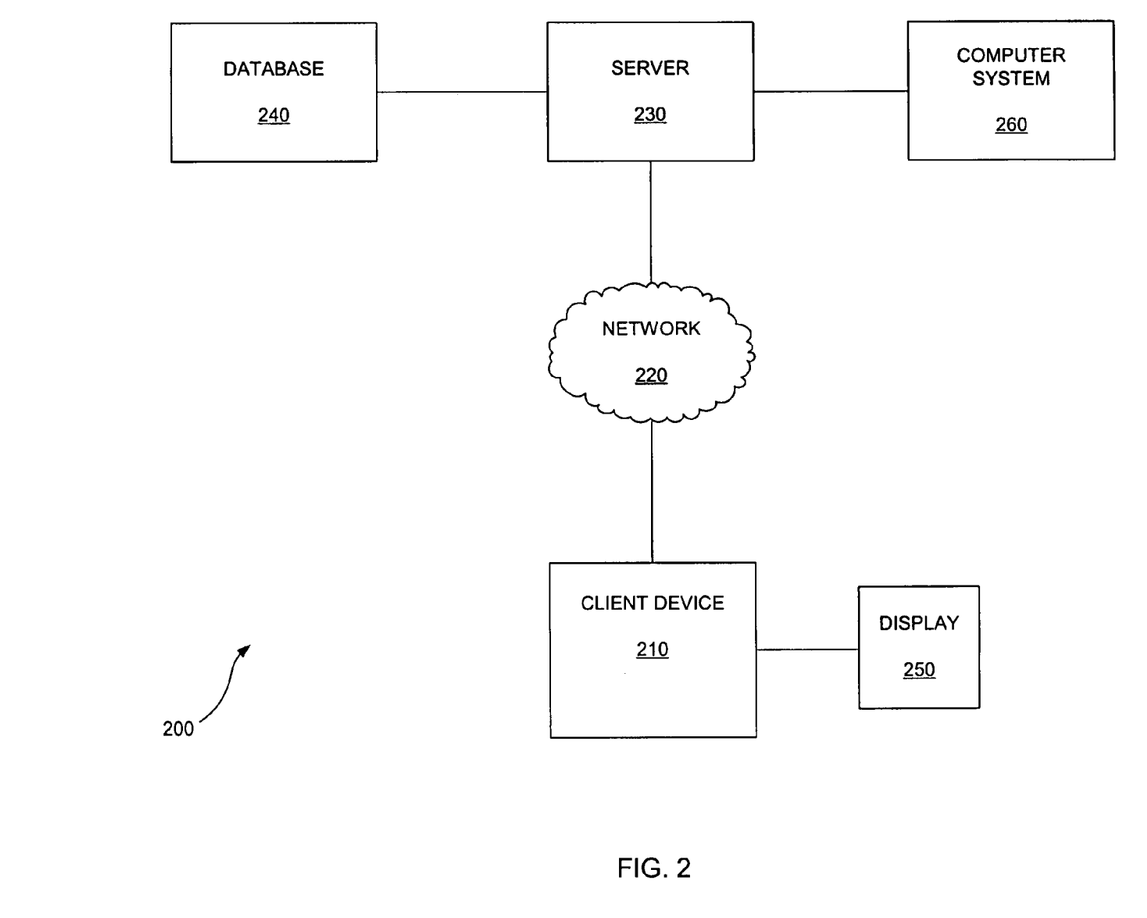
FIG. 2 is a functional block diagram of an exemplary operating environment in which an embodiment of the invention can be implemented.

Referring now to FIG. 2, an embodiment of the present invention can be described in the context of an exemplary computer network system 200 as illustrated. System 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 2 includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the device 100 illustrated in and discussed with reference to FIG. 1. Client device 210 includes or is otherwise coupled to a computer screen or display device 250. Client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

Figure 3:
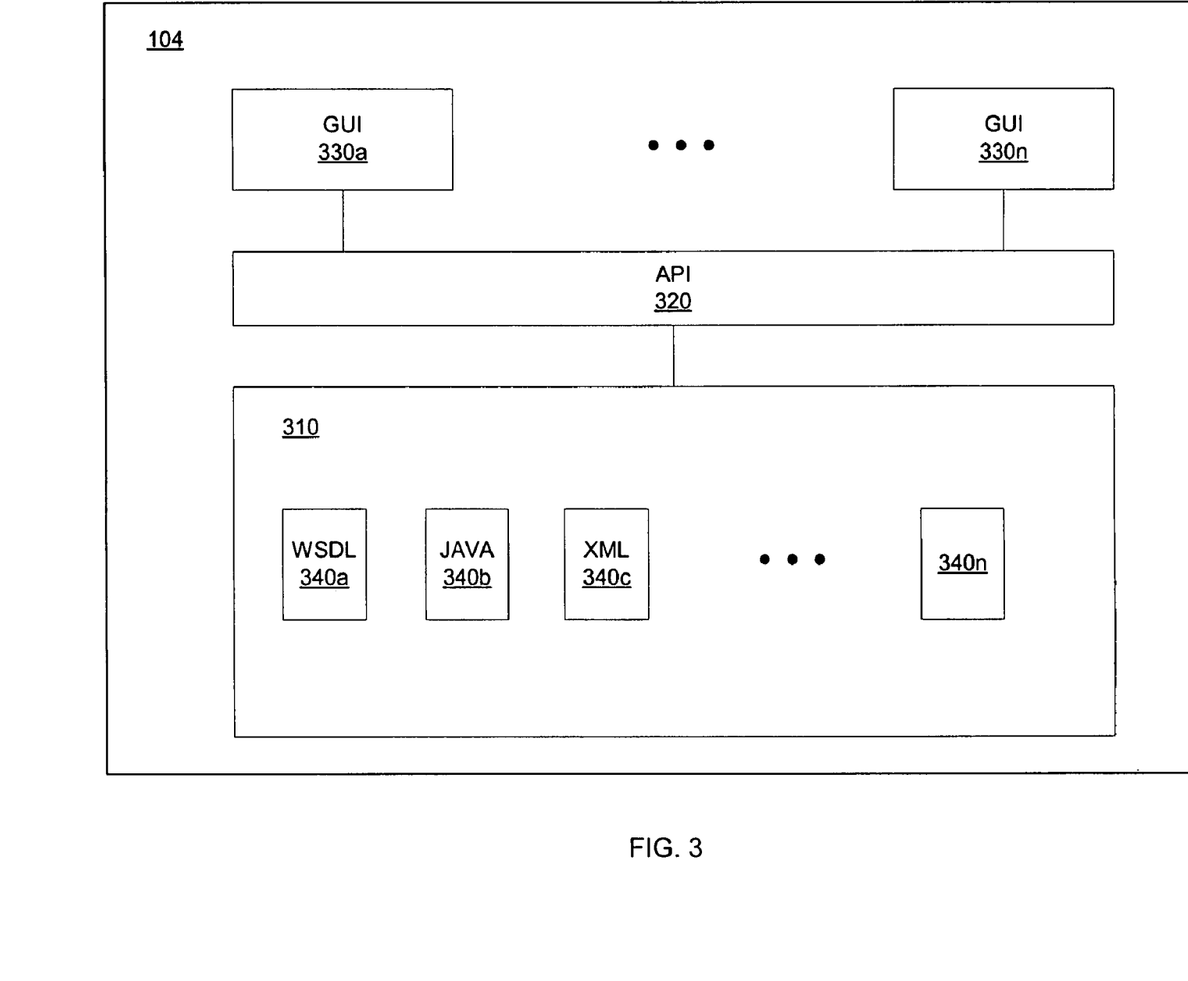
FIG. 3 is a block diagram of elements of an embodiment of the invention.

In operation, according to an embodiment of the invention, a user of the client device 210 may download from the server 230, or otherwise conventionally obtain, computer-executable instructions/applications illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

Still referring to FIG. 3, and in an embodiment, the computer-executable instructions/applications include a specification engine 310, an API 320, and one or more GUI modules 330, each of which may be stored in the memory 104 and executable by the processing unit 102 of the client device 210. As is discussed more fully hereinafter, the API 320 provides an interface between the engine 310 and multiple types of GUI environments, including, for example, the Eclipse™ workbench environment. The engine 310 includes one or more generator modules 340 also more fully discussed hereinafter.

Among the challenges of deploying a successful enterprise architecture is properly identifying and designing the services that can be deployed on top of IT applications and systems. To that end, elements of the telecommunications industry have developed a set of standards through bodies such as, for example, the TeleManagement Forum™ or the OSS through Java™ (OSS/J) Initiative that provide design guidelines, best practices and patterns to ensure that a final solution is successful.

In an embodiment, and as is discussed more fully hereinafter, the modules 340 are configured to algorithmically apply these patterns, design guidelines and/or best practices to service-contract models to enable an OSS/BSS Architect to model, design and release standards-compliant Service Contracts.

Figure 4:
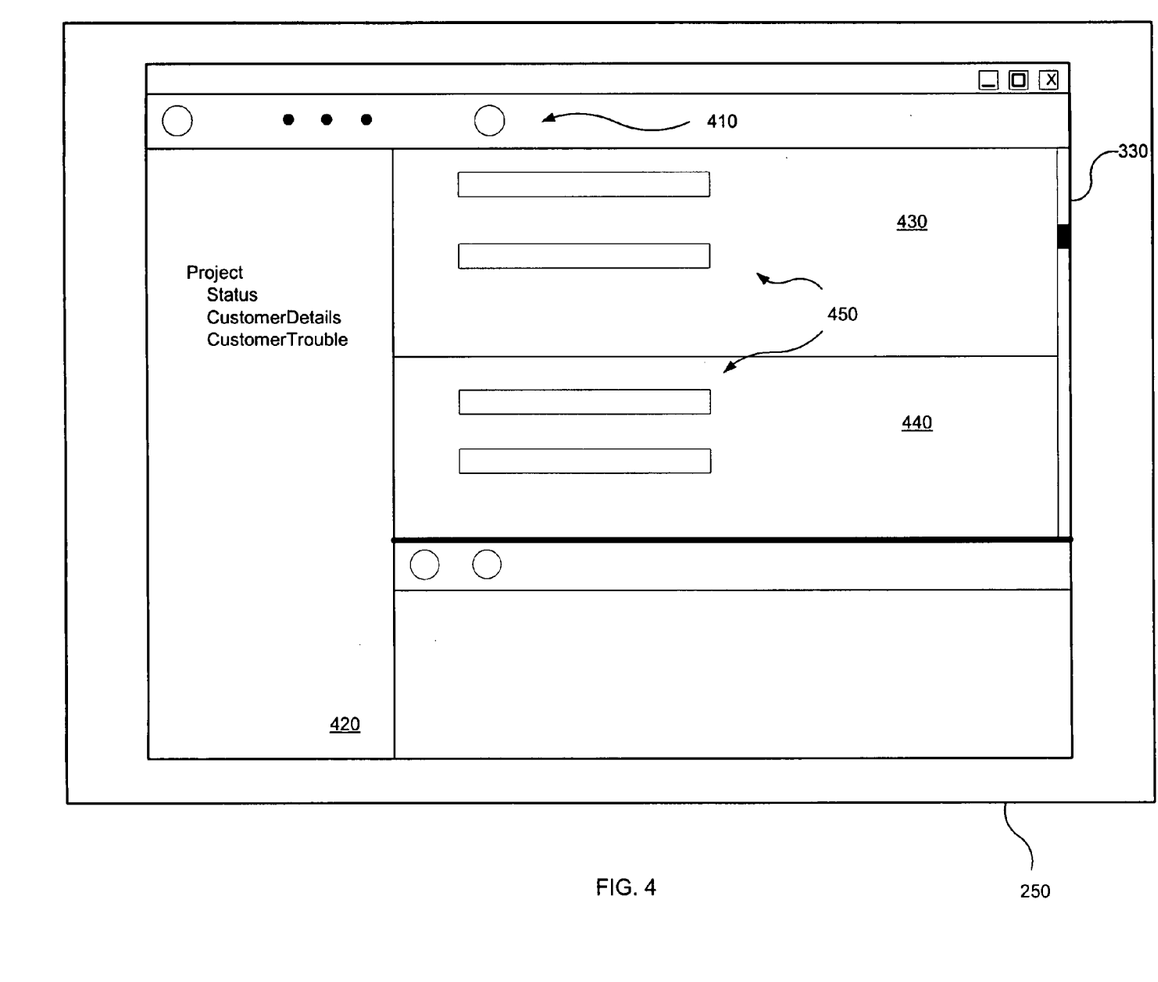
FIG. 4 is a schematic view of a graphical user interface (GUI) according to an embodiment of the invention.

Referring to FIG. 4, and in operation according to an embodiment of the invention, a user of the client device 210 desiring to create a service contract may invoke, through conventional means, display of a GUI 330 on the display device 250. In an embodiment, the GUI 330 includes a workspace that allows a user to create and work with projects. Each project may be considered a container for resources (files, source code, directories, etc.) that are contextually linked. Consequently, a project may contain data defining a Service-contract model. Such a project may contain Service-contract model components (e.g., artifacts), documentation and/or any other file or directory that is relevant to be stored within the context of a project.

Figure 5:
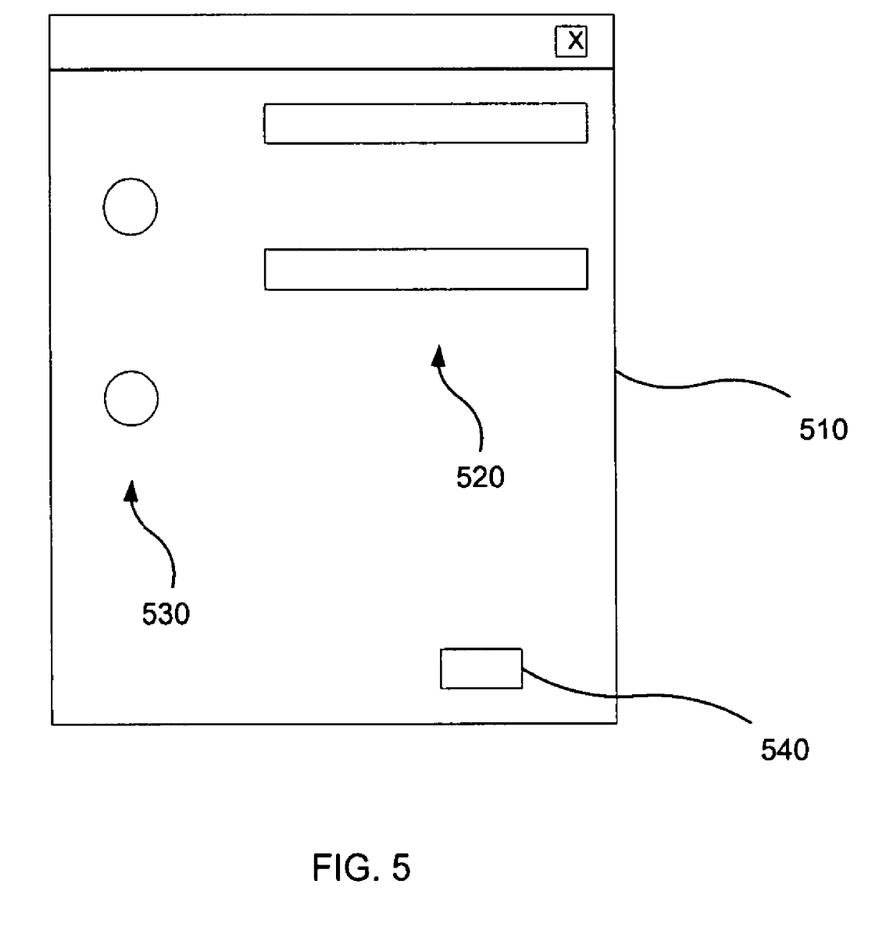
FIG. 5 is a schematic view of a window associated with a graphical user interface according to an embodiment of the invention.

Accordingly, the user may commence creation of a project by invoking a "New Project" wizard by, for example, selecting one or more buttons 410 associated with the GUI 330. Once invoked, the New Project wizard may present to the user a conventional interface, such as an interface window 510 that may include one or more data entry fields 520, radio buttons 530 and selection buttons 540 as illustrated in FIG. 5. In an embodiment, the interface window 510 solicits the user to enter a name for the project into a field 520. After entering the project name, the user may then select the button 540 to complete creation of the project. Upon creating the project, the GUI 330 may display the project name as an entry in a pane 420 that is operable to display file names in a hierarchical manner.

An embodiment of the invention implements a Model-Driven Design approach to designing service contracts. In this approach, the specifics of a target Service Contract are captured within a model that is used as input by the engine 310 to generate a corresponding Service Contract Integration profile and documentation.

In order to provide a method for successfully modeling business requirements implementable in a Service Contract, an embodiment of the invention defines a set of Artifact Representations that provide the appropriate granularity to capture, detail and document these requirements in a model. Such Artifact Representations may, for example, be built on top of unified modeling language (UML) as specific stereotypes to address Service Contract modeling. Within such a model, usual UML concepts, such as associations, inheritance, specific visibility of the components of each artifact, etc., may be implemented. Each of the Artifact Representations may respectively function to define the type of information to be exchanged between two applications or the manner in which such information shall be exchanged. An embodiment of the invention includes a meta-model that provides a model for the artifacts. All standard-specific meta-models may be derived from such a model. For example, an OSS/J Meta-model exists comprising Artifact Representations that are abstract, formal, modular realizations of the entities, procedures and guidelines found in theOSS through Java Core API standard.

As an example of how Artifact Representations can be used to build up an abstract and formal view of any interface standard, the Artifact Representations that are associated with the OSS/J Meta-Model may include the following:

Artifact Representation of an OSS/J Update Procedure—models a long running procedure to be triggered through a Service Contract. The response to triggering such a procedure can contain information about whether the procedure completed successfully or not.

Artifact Representation of an OSS/J Managed Entity—models a "thing" of physical or logical existence in an OSS/BSS system. An instance of a Managed Entity is uniquely identified by a key. Examples of Managed Entity are Switches, Circuits, Customers, etc.

Artifact Representation of an OSS/J Datatype—allows supporting datatypes to be used throughout the model. Typically, Datatype are used to define complex data types within the model. The key difference between a Datatype and a Managed Entity is that an instance of a Managed Entity can be uniquely identified with a Key; an instance of a Datatype is simply a collection of values. For example, an Address can be modeled as a Datatype.

Artifact Representation of an OSS/J Exception—used to model Exception to be thrown as a result of an error while executing a Method.

Artifact Representation of an OSS/J Notification—models a notification to be emitted by a Service Contract based on specific conditions. The payload of the defined notification is captured by the fields of this artifact.

Artifact Representation of an OSS/J Named Query—models a query mechanism to select a set of Entities based on specific criteria. For example, in the context of an Alarm Manager, a QueryAllOutstandingAlarms would return all AlarmEntities that correspond to outstanding alarms.

Artifact Representation of an OSS/J Enumeration—allows modeling of domain-specific enumerations (e.g., set of pre-defined values). For example, a ProbableCause enumeration could be defined with the series of pre-defined Probable-Causes to be used within Alarms.

Artifact Representation of an OSS/J Session Facade—models an integration point for a Service Contract. Through this facade, operations on Managed Entities are exposed, Queries and UpdateProcedure are accessible. Also, this is the logical source of emitted notifications. Defining Session Facades is typically, but not necessarily, the final step in assembling a Service Contract, where information model and the capabilities of the Service Contract are selected.

It is to be appreciated that additional Artifact Representations may be implemented in the context of the OSS/J Meta-Model. It is to be further appreciated that functionally similar artifacts associated with standards other than OSS/J may be employed by embodiments of the invention.

An Artifact Representation may contain Field Definitions. An Artifact Representation Field Definition may be used to capture specific properties associated with an interface standard artifact. For example, as described above, an OSS/J Meta-model defines "Notification". The Fields defined on a Notification define specific properties of the modeled notification (i.e., the payload to be carried by the notification itself). Artifact Representation Fields may be of primitive types or any other known artifact type.

An Artifact Representation may contain Constant Definitions. An Artifact Representation Constant Definition allows the capture of scoped values for any Artifact Field or Artifact method input/output parameter. For example, in a Notification, constants can be used to define fixed states to be carried by a Field of that notification (e.g., "FAILED", "COMPLETE", etc.).

An Artifact Representation may contain Method Definitions. An Artifact Representation Method Definition allows specification of operations allowed on the target Artifact. For example, in the context of an OSS/J Managed Entity, a "reset( )" operation can be defined as a way to reset all fields of the target managed entity to factory defaults (e.g., Artifact Representation Methods may take typed arguments as input and may return a typed result).

Each of these elements of an Artifact Representation can be further qualified by a textual description that is propagated into the generated code and documentation where appropriate.

When triggering the generation of the corresponding Service Contract, an embodiment of the invention applies the generation rules for each Artifact Representation type, Field, method and constant and produces the corresponding code.

For purposes of illustration, consider the example of a Service Contract that is desired to support transfer of information about a CustomerTroubleReport. Such a report may have attributes such as Customer details, type of problem, status, etc. In the context of an OSS/J Meta-Model, the CustomerTroubleReport can be modeled as a Managed Entity, which can have attributes to support these different types of information.

In this example, the user must first create any "types" that may serve as attribute types. Consider a "status" attribute that may have a fixed set of values (e.g., New, Open, Closed, etc.), so is ideally suited to the Enumeration artifact. To create an Enumeration, the user may launch a "New Enumeration Wizard" by, for example, selecting one or more buttons 410 associated with the GUI 330.

Once invoked, the Enumeration wizard may present to the user a conventional interface, such as the interface window 510. In an embodiment, the interface window 510 solicits the user to enter the name of the Enumeration—in this example, "Status". After entering the Enumeration name, the user may then select the button 540 to complete creation of the Enumeration. Upon creating the Enumeration, the GUI 330 may display the Enumeration name as an entry in the pane 420. Additionally, the GUI 330 may display an editor in one of panes 430, 440. In an embodiment, this editor has the same basic layout and functionality for all interface standards.

The editor may be operable to allow the user to review and edit the allowed values of the Enumeration. For example, the editor may allow the user to enter the values (e.g., New, Open, Closed, etc.), as well as associated integers as which the values will be exchanged, into fields 450 in order to associate these values with the "Status" enumeration.

In addition, it may be desirable to use an instance of an Artifact Representation for Datatypes to represent common types of data. In this example, it is reasonable to assume that Customer details can have a reusable set of attributes (e.g., Name, Address, Phone Number, etc.). Creating and editing a Datatype may be achieved in a manner similar to that described above in connection with the Enumeration. For purposes of this example, the name given by the user to the Datatype is "CustomerDetails". As such, the editor may allow the user to enter the attributes (e.g., Name, Address, Phone Number, etc.), as well as associated integers as which the values will be exchanged, into fields 450 in order to associate these attributes with the "CustomerDetails" Datatype.

In this example, a further step may include using an Artifact Representation of a Managed Entity for creating and editing a Managed Entity in a manner similar to that described above. For purposes of this example, the name given by the user to the Entity artifact is "CustomerTrouble". The editor allows the user to associate the previously defined artifacts (e.g., CustomerDetails, Status, etc.) with the CustomerTrouble Entity.

In a similar manner, other Artifact Representations (e.g., of Notifications, Queries, Update Procedures) may be created and added, as appropriate, to the model. Subsequently, in an embodiment, an Artifact Representation of a Session Facade is created by the user.

A Session Facade equates to an integration point within the defined Service Contract. The GUI 330 provides a wizard allowing the creation and editing of a Session Facade artifact. Specifically, in an embodiment, the wizard enables the user to add to and associate with the Session Facade each of the previously created artifacts of which the model is comprised.

In an embodiment, after constructing the Session Facade, the user selects, via the GUI 330, the target Integration Profiles. A run of an embodiment of the invention on a model can be configured to produce a set of technology-specific integration profiles that provide a concrete, implementable specification of the target Service Contract. Based on a model, an embodiment of the invention can generate multiple concrete integration profiles that are semantically equivalent. Integration profiles initially target the following three technologies:

J2EE Integration Profile: this integration profile is intended for tightly coupled integration in a J2EE environment. The Service Contract model is transformed into a set of Java interfaces relying on the use of Session Beans to implement the main integration point.

XML Integration Profile: this integration profile is intended for loosely coupled integration in a Message-Oriented Middleware. The Service Contract model is transformed into a series of XML message definitions that follow the semantics of the given model.

Web Service Integration Profile: this integration profile is intended for a true Web-Service based Service Oriented Architecture paradigm. The Service Contract model is transformed into a series of Web Services and associated XML Schema definitions, fitting the SOA paradigm.

After selecting the desired integration profile(s), the user may, for example, select one or more buttons 410 to initiate generation of the desired service-contract specification(s). Subsequently, in an embodiment, the model defined by the user-created artifacts is provided to the engine 310 as a runtime-in-memory image. Depending on the selected integration profile(s), the appropriate modules 340 are applied to the model to yield the desired service-contract specification(s). For example, if the J2EE Integration Profile and XML Integration Profile were selected, modules 340b and 340c illustrated in FIG. 3 would be applied to the model. In an embodiment, upon generation of the Service Contract specification(s), the corresponding code is placed in a newly created target folder viewable in the pane 420.

Figure 6:
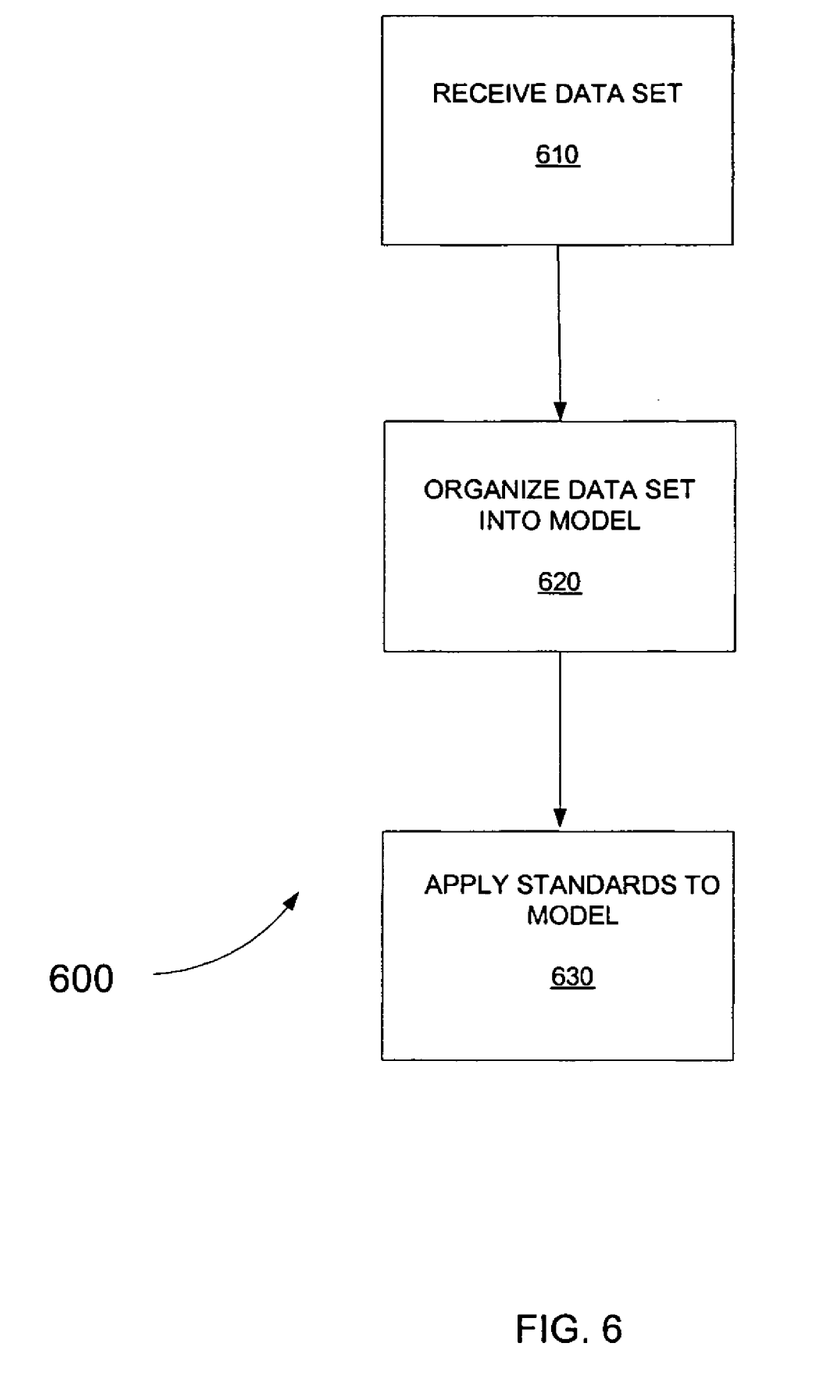
FIG. 6 is a flow diagram illustrating a method according to an embodiment of the invention.

FIG. 6 illustrates a process 600 according to an embodiment of the invention. The process 600 is illustrated as a set of operations shown as discrete blocks. The process 600 may be implemented in any suitable hardware, software, firmware, or combination thereof. The order in which the operations are described is not to be necessarily construed as a limitation.

At a block 610, a data set characterizing a first enterprise application is received. For example, a user, via the client device 210, may enter into the GUI 330 information, such as values and attributes (e.g., New, Open, Name Address) associated with one or more Artifact Representations, as described above with reference to FIGS. 4 and 5. Such Artifact Representations may be used to characterize a service associated with one or more enterprise applications.

At a block 620, the data set is organized into a model. For example, and as also described above with reference to FIGS. 4 and 5, the client device 210 may construct from the data set a formal model of a Service Contract comprising Artifact Representations.

At a block 630, a set of standards is applied to the model. Application of the set of standards to the model yields a second set of computer-executable instructions operable to enable implementation of an interface between the first enterprise application and a second enterprise application. For example, the user may select one or more buttons 410 to initiate generation of the desired service-contract specification(s). Subsequently, in an embodiment, the model defined by the user-created artifacts is provided to the engine 310 as a runtime-in-memory image. Depending on the selected integration profile(s), the appropriate modules 340 are applied to the model to yield the desired service-contract specification(s). For example, if the J2EE Integration Profile and XML Integration Profile were selected, modules 340b and 340c illustrated in FIG. 3 would be applied to the model.

Figure 7:
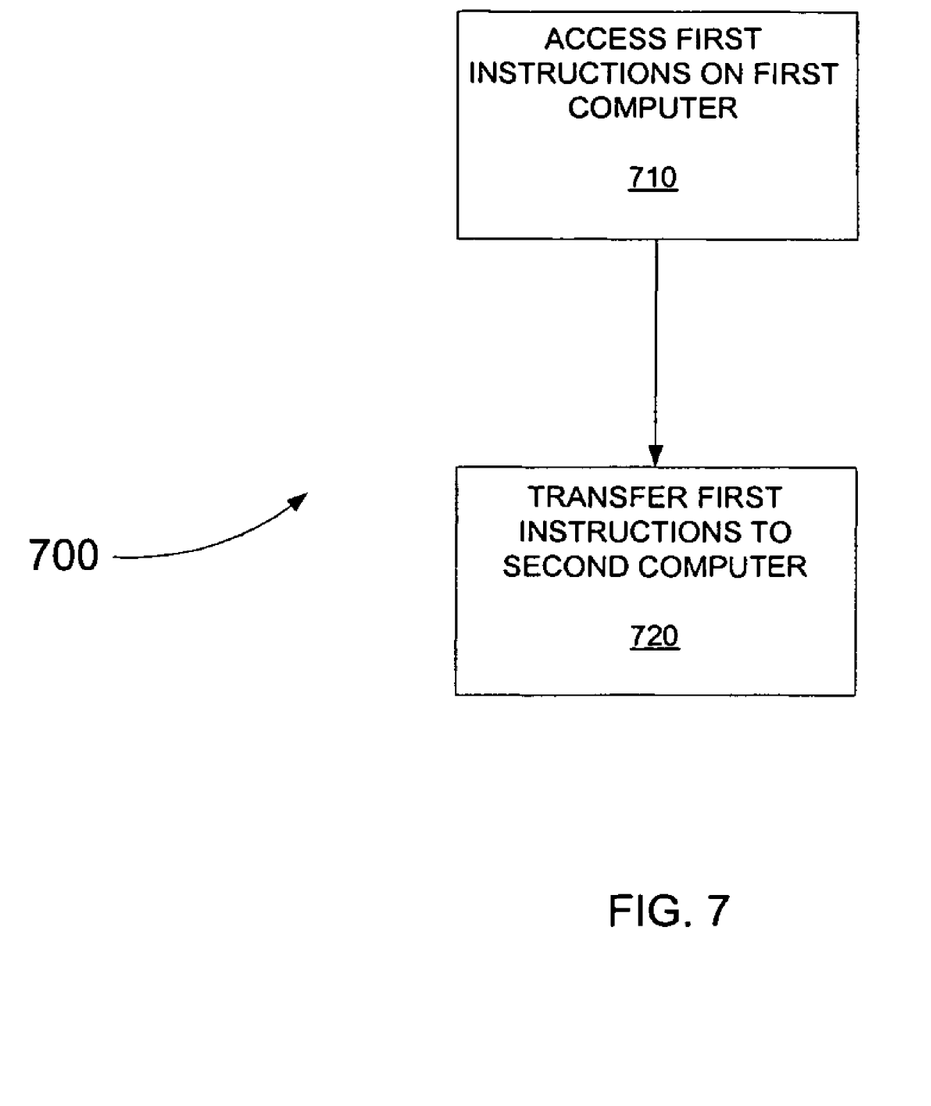
FIG. 7 is a flow diagram illustrating a method according to an embodiment of the invention.

FIG. 7 illustrates a process 700 according to an embodiment of the invention. The process 700 is illustrated as a set of operations shown as discrete blocks. The process 700 may be implemented in any suitable hardware, software, firmware, or combination thereof. The order in which the operations are described is not to be necessarily construed as a limitation.

At a block 710, on at least one first computer, first computer-executable instructions are accessed. In an embodiment, when executed on a data processing system, the first computer-executable instructions perform at least the steps of:

(1) receiving a data set characterizing a first enterprise application;

(2) organizing the data set into a model;

(3) applying a set of standards to the model, wherein application of the set of standards to the model yields a second set of computer-executable instructions operable to enable implementation of an interface between the first enterprise application and a second enterprise application.

For example, the server 230 may access the instructions (e.g., the API 320 and/or engine 310) from the database 240, the computer system 260, and/or a memory associated with the server 230.

At a block 720, the first computer-executable instructions are transferred from the at least one first computer to at least one second computer through a communications L medium. For example, the client device 210 may download the instructions from the server 230 via the network 220.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An article of manufacture comprising a non-transitory machine-readable storage medium having machine executable instructions embedded thereon, which when executed by a machine, cause the machine to:

receive a data set characterizing a first enterprise application, the data set including artifact representations, the artifact representations including at least one data definition and at least one method definition specifying an operation allowed on a corresponding artifact;

organize the data set into a model;

apply a set of standards to the model, the set of standards including an integration profile for a desired target environment, the target environment being a computing environment having defined interfaces, the integration profile being user-selectable, the integration profile configuring the model for automatic generation of computer-executable instructions for execution in one of a plurality of target environments selected front the group: a J2EE environment, a Message-Oriented Middleware environment, and a web-based service oriented architecture environment; and automatically generate a second set of computer-executable instructions from the model, the second set of computer-executable instructions enabling implementation of an application programming interface (API) between the first enterprise application and a second enterprise application in the desired target environment, the API including at least one target environment specific data definition and at least one target environment specific method definition, the API being a runtime memory image, the API providing data communication between the first enterprise application and the second enterprise application in the desired target environment.

2. The article of manufacture as claimed in claim 1 wherein the artifact representations include an exception handling definition.

3. The article of manufacture as claimed in claim 1 wherein the artifact representations include a notification definition.

4. The article of manufacture as claimed in claim 1 wherein the artifact representations include a query mechanism definition.

5. The article of manufacture as claimed in claim 1 wherein the artifact representations include a session facade definition.

6. The article of manufacture as claimed in claim 1 wherein the artifact representations are built using a unified modeling language (UML).

7. The article of manufacture as claimed in claim 1 wherein the model is a runtime-in-memory image.

8. A method comprising:
receiving a data set characterizing a first enterprise application, the data set including artifact representations, the artifact representations including at least one data definition and at least one method definition specifying an operation allowed on a corresponding artifact;
organizing the data set into a model;
applying, by use of a processor, a set of standards to the model, the set of standards including an integration profile for a desired target environment, the target environment being a computing environment having defined interfaces, the integration profile being user-selectable, the integration profile configuring the model for automatic generation of computer-executable instructions for execution in one of a plurality of target environments selected from the group: a J2EE environment, a Message-Oriented Middleware environment, and a web-based service oriented architecture environment; and
automatically generating a second set of computer-executable instructions from the model, the second set of computer-executable instructions enabling implementation of an application programming interface (API) between the first enterprise application and a second enterprise application in the desired target environment, the API including at least one target environment specific data definition and at least one target environment specific method definition, the API being a runtime memory image, the API providing data communication between the first enterprise application and the second enterprise application in the desired target environment.

9. The method as claimed in claim 8 wherein the artifact representations include an exception handling definition.

10. The method as claimed in claim 8 wherein the artifact representations include a notification definition.

11. The method as claimed in claim 8 wherein the artifact representations include a query mechanism definition.

12. The method as claimed in claim 8 wherein the artifact representations include a session facade definition.

13. The method as claimed in claim 8 including building the artifact representations using a unified modeling language (UML).

14. The method as claimed in claim 8 wherein the model is a runtime-in-memory image.

15. A computer system comprising:
a processor;
a memory coupled to the processor;
a communication connection coupled to the processor and the memory; and
a specification engine being configured to receive a data set characterizing a first enterprise application, the data set including artifact representations, the artifact representations including at least one data definition and at least one method definition specifying an operation allowed on a corresponding artifact, the specification engine being further configured to organize the data set into a model, the specification engine being further configured to apply a set of standards to the model, the set of standards including an integration profile for a desired target environment, the target environment being a computing environment having defined interfaces, the integration profile being user-selectable, the integration profile configuring the model for automatic generation of computer-executable instructions for execution in one of a plurality of target environments selected from the group: a J2EE environment, a Message-Oriented Middleware environment, and a web-based service oriented architecture environment, and the specification engine being further configured to automatically generate a second set of computer-executable instructions from the model, the second set of computer-executable instructions enabling implementation of an application programming interface (API) between the first enterprise application and a second enterprise application in the desired target environment, the API including at least one target environment specific data definition and at least one target environment specific method definition, the API being a runtime memory image, the API providing data communication between the first enterprise application and the second enterprise application in the desired target environment.

16. The computer system as claimed in claim 15 wherein the artifact representations include an exception handling definition.

17. The computer system as claimed in claim 15 wherein the specification engine being further configured to build the artifact representations using a unified modeling language (UML).

* * * * *